(12) United States Patent
Heidler

(10) Patent No.: US 9,154,311 B2
(45) Date of Patent: Oct. 6, 2015

(54) COUPLING DEVICE TO COUPLE A SUPPLY POWER SOURCE TO A COMMUNICATION CABLE

(71) Applicant: CCS Technology, Inc., Wilmington, DE (US)

(72) Inventor: Christian Heidler, Hohenschaeftlarn (DE)

(73) Assignee: CCS Technology, Inc., Wilmington, DE (US)

( * ) Notice: Subject to any disclaimer, the term of this patent is extended or adjusted under 35 U.S.C. 154(b) by 451 days.

(21) Appl. No.: 13/718,345

(22) Filed: Dec. 18, 2012

(65) Prior Publication Data

US 2013/0187481 A1     Jul. 25, 2013

(30) Foreign Application Priority Data

Dec. 21, 2011   (EP) ...................................... 11194914

(51) Int. Cl.
*H04L 12/10*          (2006.01)

(52) U.S. Cl.
CPC ............. H04L 12/10 (2013.01); *Y10T 307/766* (2015.04)

(58) Field of Classification Search
CPC ............................ Y10T 307/766; H04L 12/10

USPC ......................................................... 307/116
See application file for complete search history.

(56) References Cited

U.S. PATENT DOCUMENTS

2007/0296394 A1   12/2007   Landry et al. ................. 323/371
2010/0217447 A1    8/2010   Karam .......................... 700/286

FOREIGN PATENT DOCUMENTS

EP            1100226 A1    5/2001   .............. H04L 12/10

OTHER PUBLICATIONS

European Search Report, Jun. 4, 2012, 6 pages.

*Primary Examiner* — Rexford Barnie
*Assistant Examiner* — Thai Tran

(57) ABSTRACT

The coupling device comprises a controllable switch unit coupled to an output side of the communication cable, and having a first, a second and a third state. In the first state, a voltage of the communication cable is detected, and the setting of the controllable switch unit is changed from the first state to the second state, if the detected voltage is below a threshold level. In the second state, the communication cable is connected to a controller to check the reception of an identification signal indicating to the controller that a coupling device to couple a load to the cable is connected to the cable. If the identification signal is identified by the controller, the controllable switch unit connects the supply power source to the communication cable.

20 Claims, 9 Drawing Sheets

COUPLING DEVICE TO COUPLE A SUPPLY POWER SOURCE TO A COMMUNICATION CABLE

RELATED APPLICATIONS

This application claims the benefit of priority under 35 U.S.C. §119 of European Patent Application Serial No. 11194914.5 filed on Dec. 21, 2011, the content of which is relied upon and incorporated herein by reference in its entirety.

TECHNICAL FIELD

The technology of the disclosure relates to a coupling device to couple a supply power source to a communication cable to supply power to a load connected to the communication cable. The disclosure further relates to a method to supply a supply power via the communication cable to a load coupled to the communication cable.

BACKGROUND

In an Ethernet network Ethernet signals and power-over-Ethernet (PoE) may be transmitted over the same communication cable, such as a twisted pair copper cable. In order to supply power to a load coupled to the end of the cable, the supply power can be transmitted over the twisted pair copper cable to a power remote-side unit (RU). The power remote-side unit couples the transmitted power out of the cable and provides the supply power to the load. The power for the remote-side equipment may be coupled in the cable at a central side using a central side unit (CU). The twisted pair copper cable connects the central and the remote units.

To be able to use usual network components for the cable and connectors, standard connectors, such as 8P8C (aka RJ45) connectors, may be used to connect the communication cable to the central side unit and the remote-side unit. This leads to the potential risk that a standard Ethernet device may be directly connected to the output of the central side unit and, thus, is directly connected to the power source. An Ethernet device could be damaged by the output power of the central side unit, if a twisted pair cable which is connected to this device at the remote side is plugged in the output connector of the CU at the central location. Furthermore, if by mistake, for example, an Ethernet switch is plugged in the output connector of a central side unit, the Ethernet switch could be damaged, if the output power of the central side unit is switched on.

It may be an impetus to provide a coupling device to couple a supply power source to a communication cable without the risk to damage a device also coupled to the communication cable. It may also be an impetus to provide a coupling device to couple a load to a communication cable on which a supply power is transferred without the risk to damage the device. It is further desirable to provide an arrangement to supply a supply power via a communication cable without the risk to damage a device coupled to the communication cable by the supply power. Furthermore, it may be desirable to provide a method to supply a supply power via a communication cable without the risk to damage a device coupled to the communication cable by the supply power.

SUMMARY

Embodiments disclosed in the detailed description include a coupling device to couple a supply power source to a communication cable, a coupling device to couple a load to a communication cable, an arrangement to supply a supply power via a communication cable, and a method to supply a supply power via a communication cable.

An embodiment of a coupling device to couple a supply power source to a communication cable comprises an input side to be coupled to the supply power source, an output side to be coupled to a first end of the communication cable, a controllable switch unit coupled to the output side, and having a first, a second and a third state. The coupling device further comprises a controller to control a switch setting of the controllable switch unit. In the first state of the controllable switch unit, the first end of the cable is operated in an idle state, when the first end of the cable is coupled to the output side, and a voltage of the cable is detected, and the setting of the controllable switch unit is changed from the first state to the second state, if the detected voltage is below a threshold level. In the second state of the controllable switch unit, the output side is coupled to the controller and, in the condition where the first end of the cable is connected to the output side, the controller is configured to check the reception of an identification signal indicating to the controller that a coupling device to couple a load to the cable is connected to a second end of the cable, and the setting of the controllable switch unit is changed from the second state to the third state, if the identification signal is identified by the controller. In the third state of the controllable switch unit, the controllable switch unit connects the input side to the output side.

An embodiment of a coupling device to couple a load to a communication cable comprises an input side to be coupled to the cable, an output side to be coupled to the load, a controllable switch unit coupled to the input side, and having a first and a second state, and a transceiver to transmit an identification signal identifying the transceiver. In the first state of the controllable switch unit, the controllable switch unit connects the input side to the transceiver, and the transceiver transmits the identification signal to the input side. In the second state of the controllable switch unit, the controllable switch unit connects the input side to the output side.

An embodiment of an arrangement to supply a supply power via a communication cable comprises a first coupling device to couple the supply power source to the communication cable and a second coupling device to couple the load to the communication cable as explained above. The input side of the first coupling device is coupled to the supply power source, and the output side of the first coupling device is coupled to the first end of the cable. The input side of the second coupling device is coupled to the cable, and the output side of the second coupling device is coupled to the load.

An embodiment of a method to supply a supply power via a communication cable comprises: providing a cable having a first end to couple a first coupling device to the cable, the first coupling device being configured to connect a power source to the first end of the cable, and a second end to couple a second coupling device to the cable, the second coupling device being configured to couple a load to the cable, operating the first end of the cable in an idle state, measuring a voltage at the first end of the cable, generating a request signal by the first coupling device and transferring the request signal from the first end of the cable to the second end of the cable, when the measured voltage is below a threshold value, generating an identification signal by the second coupling device to identify the second coupling device by the first coupling device and transferring the identification signal via the cable to the first coupling device, when the second coupling device is coupled to the second end of the cable and the request signal is received by the second coupling device, coupling the power source to the first end of the cable to supply the supply power via the cable to the second end of the cable, when the identification signal is identified by the first coupling device, measuring a voltage at the second end of the cable, and coupling the output side to the second end of the cable, when the voltage measured at the second end of the cable increases a further threshold level.

It is to be understood that both the foregoing general description and the following detailed description present embodiments are intended to provide an overview or framework for understanding the nature and character of the coupling devices, the arrangement and the method as it is claimed. The accompanying drawings are included to provide a further understanding of the coupling devices, the arrangement and the method, and are incorporated into and constitute a part of this specification. The drawings illustrate various embodiments of the coupling devices, the arrangement and the method, and together with the description serve to explain the principals and operation of the coupling devices, the arrangement and the method.

DETAILED DESCRIPTION

Figure 1:
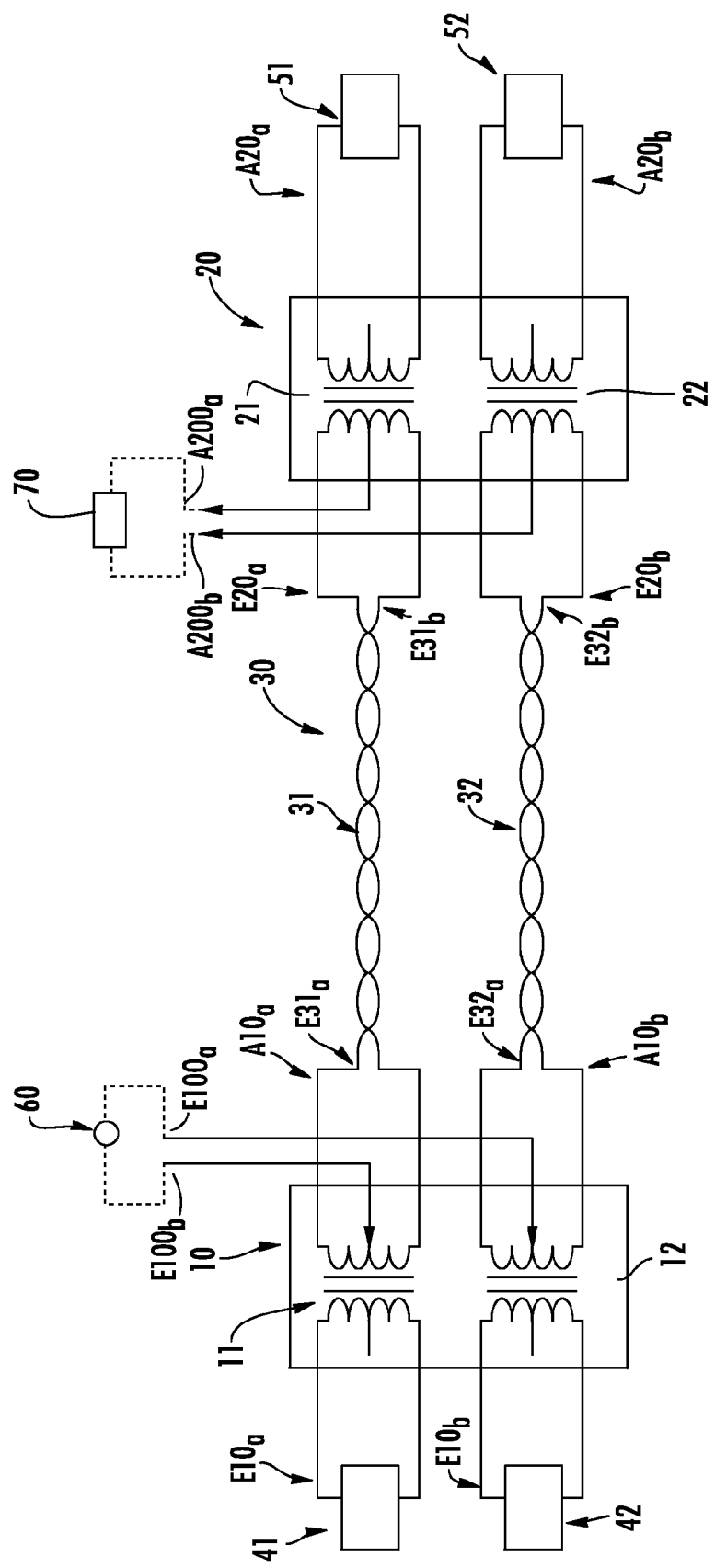
FIG. 1 shows an embodiment of an arrangement of a first and a second coupling device connected by a communication cable.

FIG. 1 shows a communication cable 30 comprising a twisted pair cable 31 and a twisted pair cable 32 which are coupled to a central side unit 10 and a remote side unit 20. The central side unit 10 comprises an output side A10a, A10b connected to an end E31a, E32a of the cable 30. An input side E100a, E100b may be connected to a supply power source 60, and an input side E10a, E10b of the central side unit is connected to communication devices 41, 42, such as an Ethernet switch, to provide data signals to be transferred via the communication cable 30. The central side unit 10 comprises transformers 11, 12. The power source 60 is connected to center taps of the transformers 11, 12 to supply a supply power to the communication cable 30.

At the remote side the remote side unit 20 comprises an input side E20a, E20b coupled to an end E31b, E32b of the cable 30. An output side A200a, A200b of the remote side unit 20 is coupled to a load 70, and an output side A20a, A20b is coupled to communication devices 51, 52, such as Ethernet devices. The remote side unit 20 comprises transformers 21, 22. The load 70 is connected to center taps to the pairs of transformers 21 and 22 to couple the supply power transferred via the cable 30 out of the communication cable and to transfer the power to the load 70.

The remote side unit 20 enables that the supply power provided by the supply power source 60 is coupled out of the communication cable 30 so that communication devices 51, 52 to receive data signals are blocked from a high electrical power transferred via the communication cable harnesses 31 and 32.

Figure 2:
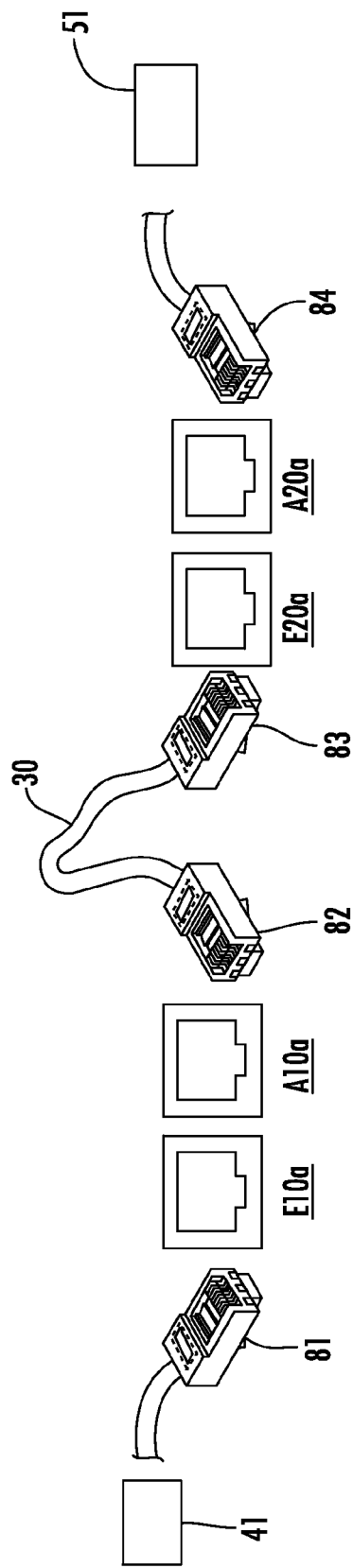
FIG. 2 shows a connection scheme to connect an Ethernet switch to an Ethernet device via a first coupling device and a second coupling device connected via a communication cable.

FIG. 2 shows a connection scheme to connect a communication device 41, such as an Ethernet switch, to another communication device 51, for example an Ethernet device or a wireless access point, via a coupling device 10, a communication cable 30 and a coupling device 20. The connectors at the input side E10a and the output side A10a of the central side unit 10 are formed to plug-in a connector 81 of the communication device 41 and a connector 82 terminating an end of the communication cable 30. The input side E20a and the output side A20a of the remote side unit 20 are formed as connectors to insert a connector 83 terminating the cable 30 and a connector 84 terminating a cable connected to the communication device 51.

If the central side unit is formed as shown in FIG. 1, a supply power is provided at the output side A10a, A10b. If the connectors 81 to 84 may be formed as standard connectors, such as 8P8C (aka. RJ45) connectors, the communication devices 41 or 51 may be directly connected to the output side A10a, A10b of the central side unit 10. The communication device 51, such as an Ethernet device, could be damaged by the output power of the central side unit 10, if a twisted pair cable which is connected to this device at the remote side is plugged in the output side A10a, A10b of the central side unit. Furthermore, if by mistake the communication device 41, such as an Ethernet switch, is plugged in the output side A10a, A10b of the central side unit, it could be damaged, if the output power of the power source 60 is switched on.

The remote side unit 20 ensures that a high electric power supplied to the communication cable 30 by the power source 60 is coupled out of the communication cable and, thus, is not transferred to the communication device 51. To assure that standard Ethernet equipment will not be damaged, when connecting to a central side unit, the central side unit has to be able to detect the presence of the remote-side unit 20 before applying power to the output side A10a, A10b of the central side unit 10.

Figure 3:
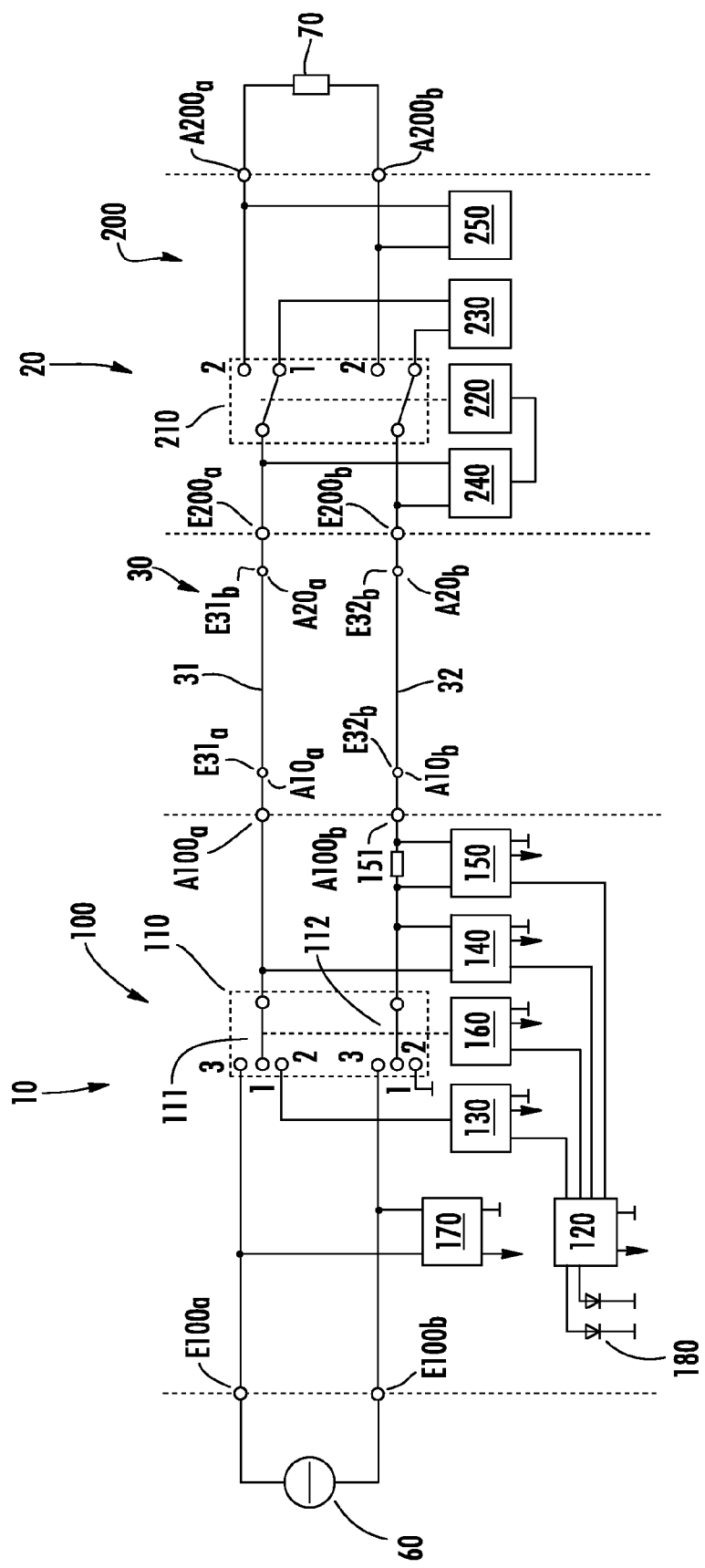
FIG. 3 shows an embodiment of an arrangement of a first coupling device and a second coupling device coupled via a communication cable to supply a supply power to a load.

FIG. 3 shows an arrangement of a central side unit 10 coupled via the communication cable 30 to a remote side unit 20. The central side unit 10 comprises a coupling device 100 and the remote side unit 20 comprises a coupling device 200. For the sake of simplicity, the pair of transformers 11, 12 of the central side unit 10 located between the end E31a, E32a of the cable 30 and the supply power source 60, and the pair of transformers 21, 22 of the remote side unit 20 located between the end E31b, E32b of the cable 30 and the load 70 are omitted in the arrangement of FIG. 3.

The communication cable 30 comprises lines 31 and 32. Each line 31, 32 may include a twisted pair cable harness such as shown in FIG. 1. The current provided by the power source 60 is split between two wires of one pair 31, 32. For the following considerations each pair of wires 31, 32 is treated as a single wire for simplification.

According to the embodiment shown in FIG. 3 the coupling device 100 comprises an input side E100a, E100b coupled to the supply power source 60 and an output side A100a, A100b coupled to the communication cable 30. The supply power source 60 is coupled to the input terminals E100a, E100b of the input side of the coupling device 100. The output side comprises output terminals A100a and A100b. A cable line 31 of the cable has an end E31a coupled to the output terminal A100a of the coupling device 100 and a cable line 32 of the cable has an end E32a coupled to the output terminal A100b of the coupling device 100. The coupling device 100 further comprises a controllable switch unit 110 having a switch 111 and a switch 112. A switch driver 160 is controlled by the controller 120 and is configured to change the settings of the controllable switches 111 and 112. The switch unit 110 allows connecting the power source 60 to the cable 30. The coupling device 100 further comprises a controller 120, such as a processor, which may be connected via a transceiver 130 of the coupling device 100 to the switch 111. The transceiver circuit 130 may be an external IC (integrated circuit) connected to the controller 120 or may be formed as a discrete circuit connected to the controller 120. A software solution incorporated in the processor's firmware may also be used to assume the functionality of the transceiver 130.

A voltage sensor 140 of the coupling device 100 is provided to measure a voltage between the output terminals A100a and A100b. The controller 120 is configured to sense the voltage between the output terminals A100a, A100b and the cable lines 31, 32 using the voltage sensor 140. The coupling device 100 further comprises a current sensor 150 which is connected to the output terminal A100b to measure a current flowing through a resistor 151 coupled to output terminal A100b. Thus, current sensor 150 is configured to measure a current flowing through the cable 30. A voltage converter 170 is connected between the input terminals E100a and E100b of the coupling device 100. The voltage converter circuit 170 enables to convert a voltage supplied by the supply power source 60 to a suitable voltage required by the controller 120 or other circuits inside the coupling device 100.

The switch unit 110 may be operated in a first, a second and a third state. In the first state "1", the end E31a, E32a of the cable is operated in an open state. In the second state "2", the output terminal A100a is connected to the transceiver 130 and the output terminal A100b is connected to a reference potential. In the third state "3", the output terminals E31a, E32a are connected to the input terminals E100a, E100b, so that the input side is coupled to the output side of the coupling device 100. Light sources 180 of the coupling device 100 are connected to the controller 120 to signal different states of the coupling device 100.

The central side controller 120 might control more than one central side units so that the costs could be shared among several central side units. Also the voltage converter and the transceiver circuit could be shared.

The coupling device 200 of the remote-side unit 20 comprises an input side E200a, E200b and an output side A200a, A200b. The input side comprises input terminals E200a and E200b, and the output side comprises output terminal A200a and A200b. The input terminal E200a is connected to an end E31b of cable line 31 and the input terminal E20b is connected to an end E32b of cable line 32. The output terminal A200a and output terminal A200b of the coupling device 200 may be connected to a load 70.

The coupling device 200 comprises a controllable switch unit 210 comprising a switch 211 and a switch 212 which allows connecting the remote load 70 to the cable 30. The switches may be formed as a MOSFET transistor circuit or a relay. The coupling device 20 further comprises a switch driver 220 to control a switch setting of the switches 211, 212. The switch driver 220 is controlled by a voltage sensor 240 of the coupling device 200. The coupling device 200 comprises a transceiver 230 to send an identification signal by which the transceiver 230 may be identified from the transceiver 130 of the coupling device 130. The coupling device 200 may also comprise a dummy load circuit 250 to ensure that a certain current flows through the cable 30 as long as the coupling device 200 is connected to the cable, even if no remote load 70 is connected to the output side A200a, A200b of the coupling device 200.

The controllable switching unit 210 may be operated in a first state "1" in which the transceiver 230 is coupled to the input terminals E200a, E200b of the input side of the coupling device 200. The controllable switching unit 210 may be operated in a second state "2" in which the output terminals A200a, A200b are coupled by the switching unit 210 to the input terminals E200a, E200b.

Figure 4:
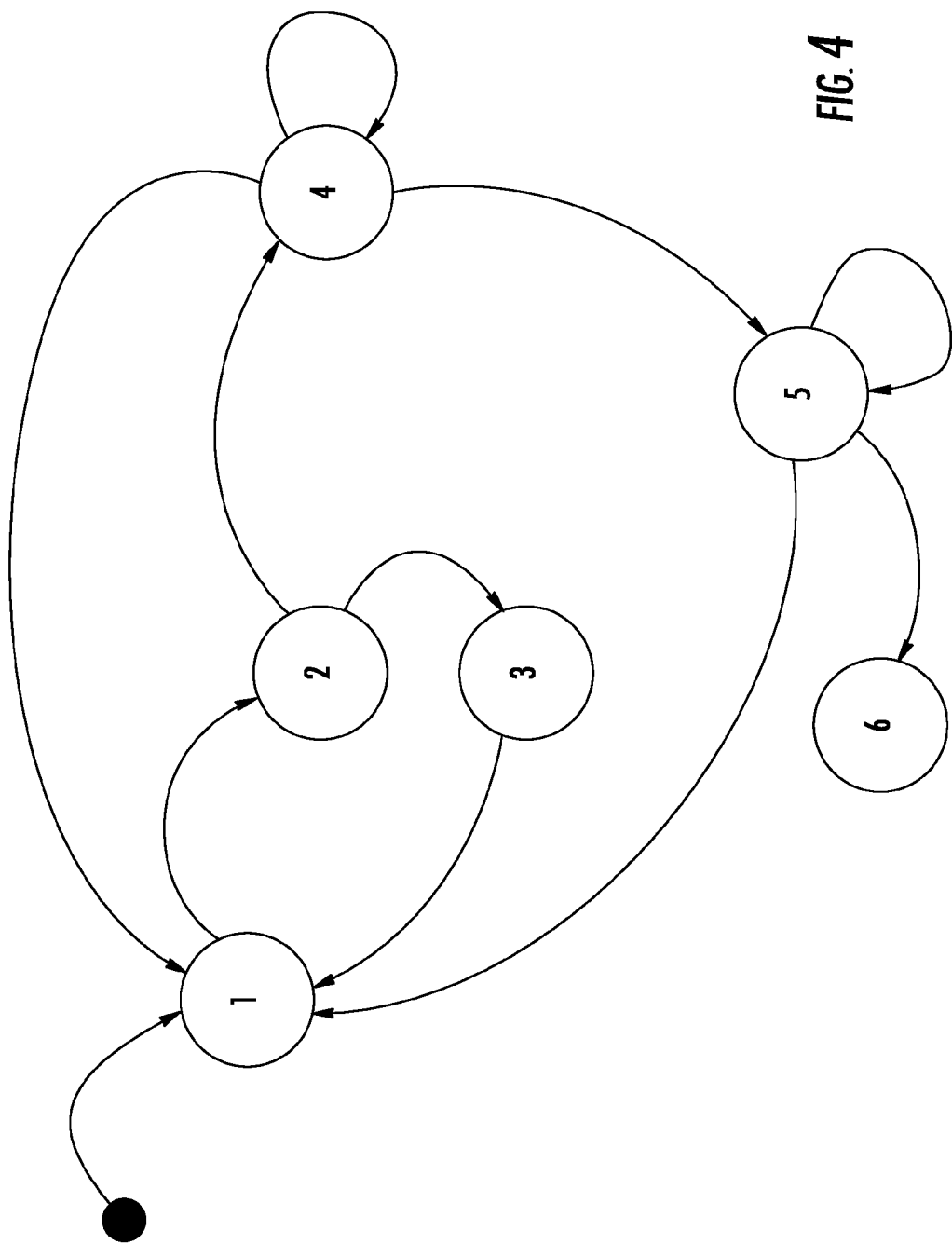
FIG. 4 shows a flow process chart illustrating a functionality of the first coupling device.

FIG. 4 shows a flow process chart of the functionality of the central side unit 10. After an initialization phase at block 1, the coupling device 100 checks at block 2, if there is any external power source connected to the output port A10a, A10b of the central side unit 10. This could happen if, for example, an Ethernet switch with power-over-Ethernet capabilities is connected to the output terminals A10a, A10b, of the central side unit 10 by mistake. The Ethernet switch would apply a low voltage to the cable 30 to sense, if a powered Ethernet device (PD) is connected which required power-over-Ethernet from the switch.

Figure 5:
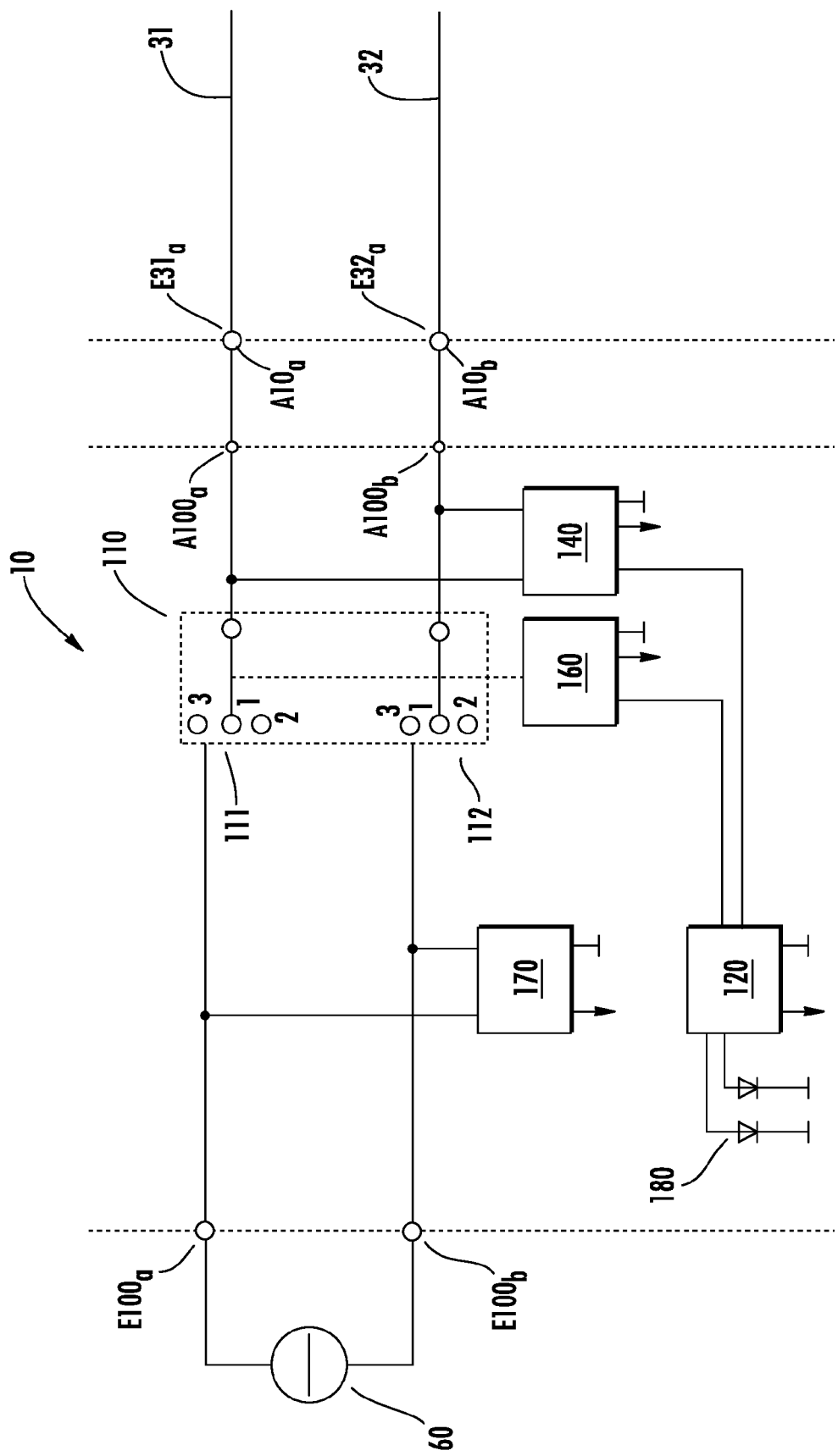
FIG. 5 shows an embodiment of an arrangement of a first coupling device coupled to a cable to sense an external voltage at an end of the communication cable by the first coupling device.

FIG. 5 shows the setting of the controllable switch unit 110 to sense an external voltage between cable lines 31, 32 by the voltage sensor 140. To sense an external voltage between output terminals A100a and A100b, the switch driver 160 controls the setting of the controllable switch unit 110 such that the power source 60 and the transceiver circuit 130 are disconnected from the cable 30 by setting the switches 111, 112 of the switch unit 110 to position "1". The switch unit is operated in the first state "1".

The voltage between the cable lines 31, 32 is measured by using the voltage sense circuit 140 of the coupling device 100. If the detected voltage exceeds a certain threshold level, the central side unit 10 enters an error state at block 3 in FIG. 4. This could be signaled by controlling the light source 180 so that, for example, an LED (light emitting diode) emits a red light. In addition, the central side unit 10 checks the voltage at the output port A100a, A100b periodically.

Figure 6:
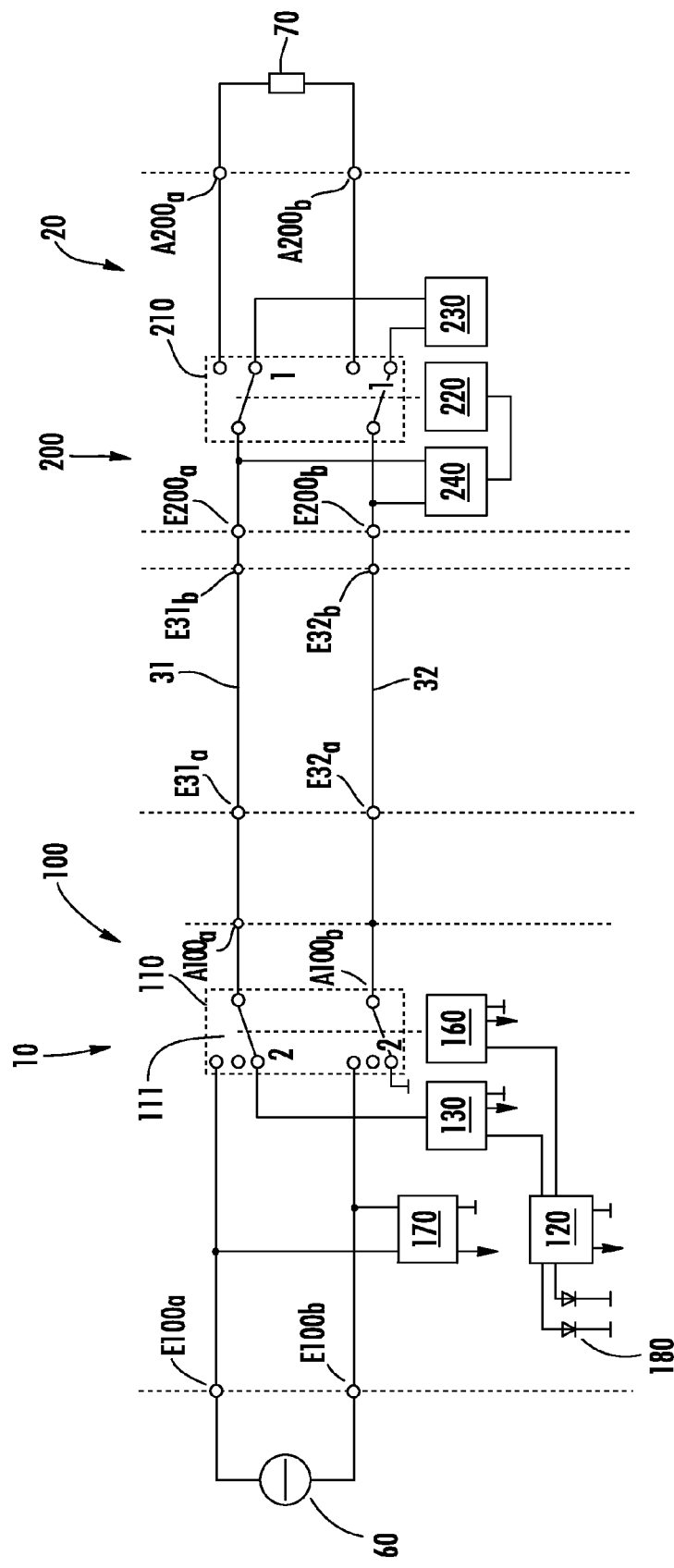
FIG. 6 shows an embodiment of an arrangement of a first and a second coupling device coupled to a cable to detect the second coupling device.

After the external voltage is switched off, or if no external power has been sensed, the central side unit 10 enters a detection state shown at block 4 in FIG. 4. In the detection state the central side unit 10 checks, if the remote-side unit 20 is present and coupled to the end E31b, E32b of the cable 30. FIG. 6 shows the configuration of the coupling circuits 100 and 200 in the detection state. For that purpose the switch driver 160 operates the controllable switch unit 110 in the second state "2". In the second state of the switch unit 110, the switch 111 connects the transceiver 130 to the output terminal A100a, and the output terminal A100b is coupled by the switch 112 to a reference potential.

The transceiver 130 may be configured as a 1-wire master so that the 1-wire master coupled to the cable 30 forms a 1-wire bus. The 1-wire bus operates with a voltage of about 3.3 to 5V DC. This voltage minus a voltage drop caused by the cable resistance and the current through the cable will be detected by the voltage sensor 240 of the remote-side unit 20 and will cause the switch driver 220 to switch the switches 211, 212 to position "1". The controllable switch unit 210 is operated in a detection state "1". In the detection state, the transceiver 230 is coupled between the input terminals E200a, E200b of the coupling device 200 so that the 1-wire device 230 will be connected to the 1-wire bus. The switch position "1" of the controllable switch unit 210 may be the default position, if no voltage would be applied.

During the detection state the controller 120 of the coupling device 100 of the central side unit 10 tries to communicate with the 1-wire device 230 using the 1-wire master circuit 130. If, for example, the 1-wire device 230 would be a serial number chip, the controller 120 could read one family code byte, six bytes of a serial number and one cyclic redundancy check byte (CRC). Thus, the central side unit 10 may check, if a remote-side unit 20 is coupled to the end E31b, E32b of the cable based on family code and CRC. The detection state may be indicated by a light source, such as a blinking green LED.

Figure 7:
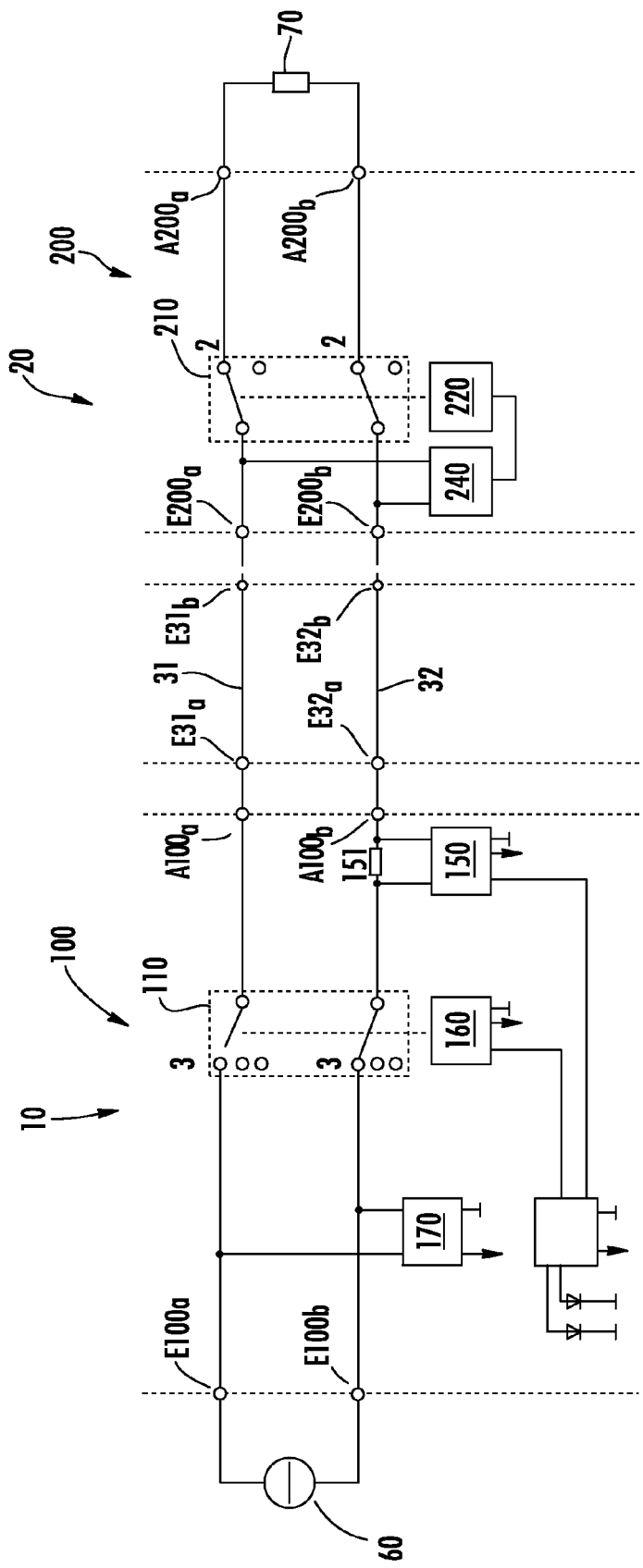
FIG. 7 shows an embodiment of an arrangement of a first and a second coupling device coupled to a cable to connect a supply power source to a load via.

If the remote-side unit 20 has been detected, the central side unit 10 enters a normal operation state at block 5 in FIG. 4. FIG. 7 shows the settings of the controllable switch units 110 and 210 in the normal operation mode. In this state the supply power source 60 is connected to the cable 30 to drive the remote load 70. For this purpose the switches 111, 112 are set to position "3" by the switch driver 160 which is controlled by the controller 120. By connecting the power source 60 to the output terminals A100a, A100b of the coupling device 100 and to the end E31a, E31b of the cable 30, the voltage at the remote side unit 20 will increase.

The voltage sensor 240 senses an increased voltage between the input terminals E200a, E200b of the coupling device 20. If the detected voltage rises above a certain threshold, the switches 211, 212 of the controllable switch unit 210 will be set to position "2" by the switch driver 220. In the setting "2" of the controllable switch unit 210 the remote load 70 is connected to the cable 30, so that the supply power provided by the power source 60 can drive the remote load 70. This state might be indicated by a light indicator, such as a steady green LED 180 at the central side unit 10.

In another embodiment of the coupling device 200 a protection circuit 250 to protect the transceiver 230 against a high voltage or a high current is provided in the coupling device 200. The protection device 250 prevents that the transceiver 230 will be damaged by a high voltage or current caused by the connection of the supply power source 60 to the communication cable and a delay time between the time of the connection of the supply power source 60 to the cable 30 and the time at which the controllable switch unit 210 switches from position "1" to position "2". The protection circuit may be configured as a Zener-diode.

As long as the remote-side unit 20 is still present, which means that the level of the current detected by the current detector 150 is between a maximum and a minimum current level, the central side unit remains in the normal operation state. If the current sensor 150 detects a current flowing through the communication cable and having a level higher than a threshold, the central side unit 10 enters an error state at block 6 in FIG. 4. In the error state, the controllable switch unit 110 is operated in the first state "1", so that the supply power source 60 will be disconnected from the output side A100a, A100b of the coupling device 100. If the remote unit has been removed, the current sensor 150 detects a current flowing through the communication cable and having a level lower than a threshold value. In the case, if no remote-side unit 20 has been detected after a certain time, because the remote side unit has been removed, the central side unit 10 enters the initialization state again and the supply power circuit is disconnected from the output side of the coupling device 100. This will cause the central side unit 10 to check for external power sources again at block 2.

Figure 8:
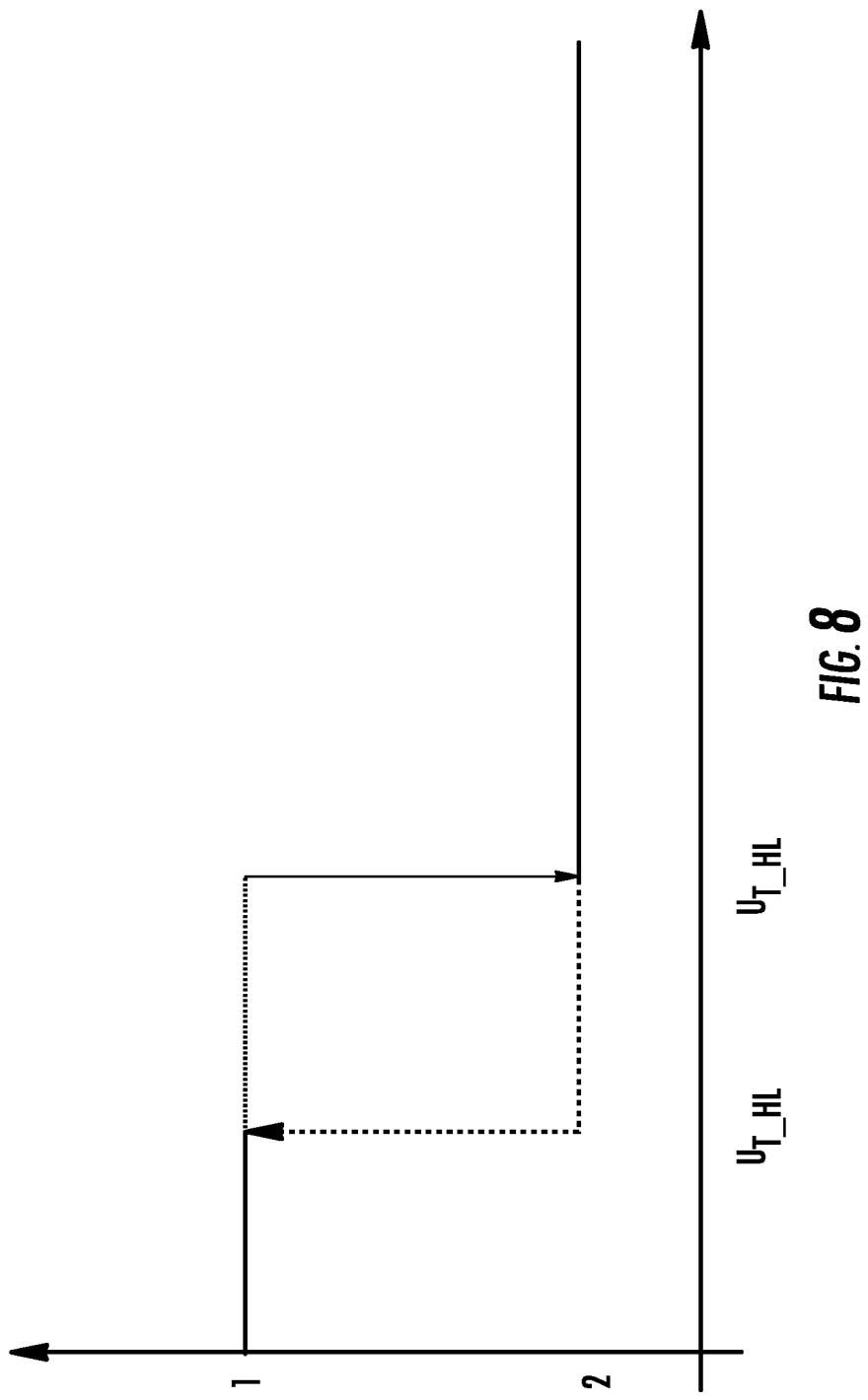
FIG. 8 shows a switching course between a first and second setting of a controllable switch unit.

FIG. 8 shows the dependency of the switch position of the controllable switch unit 210 from the voltage measured by the voltage sensor 240. As illustrated in FIG. 8, the switch position will change from position "1" to position "2", if the voltage between input terminals E200a, E200b is increased and rises above a threshold voltage UT_LH. If for any reason the voltage at the remote input side between the input terminals E200a, E200b decreases, the switch position of the controllable switch unit 210 changes from the setting "2" to the setting "1" again, if the detected voltage is below a level UT_HL, wherein the voltage level UT_HL is lower than the voltage level UT_LH.

This hysteresis will ensure that the switch position of the switches 211, 212 of the controllable switch unit 210 will not toggle due to minor voltage changes or noise on the cable. The threshold voltage UT_HL may be lower than the maximum operation voltage of the transceiver circuit 230, for example the 1-wire circuits, of the coupling device 200 to ensure that these circuits won't be damaged due to the remote load operating voltage.

During the normal operation state the coupling device 100 of the central side unit 10 monitors the current flowing through the cable 30 periodically using the current sensor circuit 150 of the coupling device 100 of the central side unit 10, so that the central side unit 10 can detect, if there is an over-current situation. If the central side unit 10 detects a current flowing through the cable which is over a threshold level suited that any device coupled to the end terminals E31b, E32b of the cable would be damaged, the controller 120 will control the controllable switch unit 110 in position "1" so that the supply power source 60 will be disconnected from the cable 30 immediately. The central side unit will enter an error state which might be indicated a light signal, such as a LED emitting red light.

Figure 9:
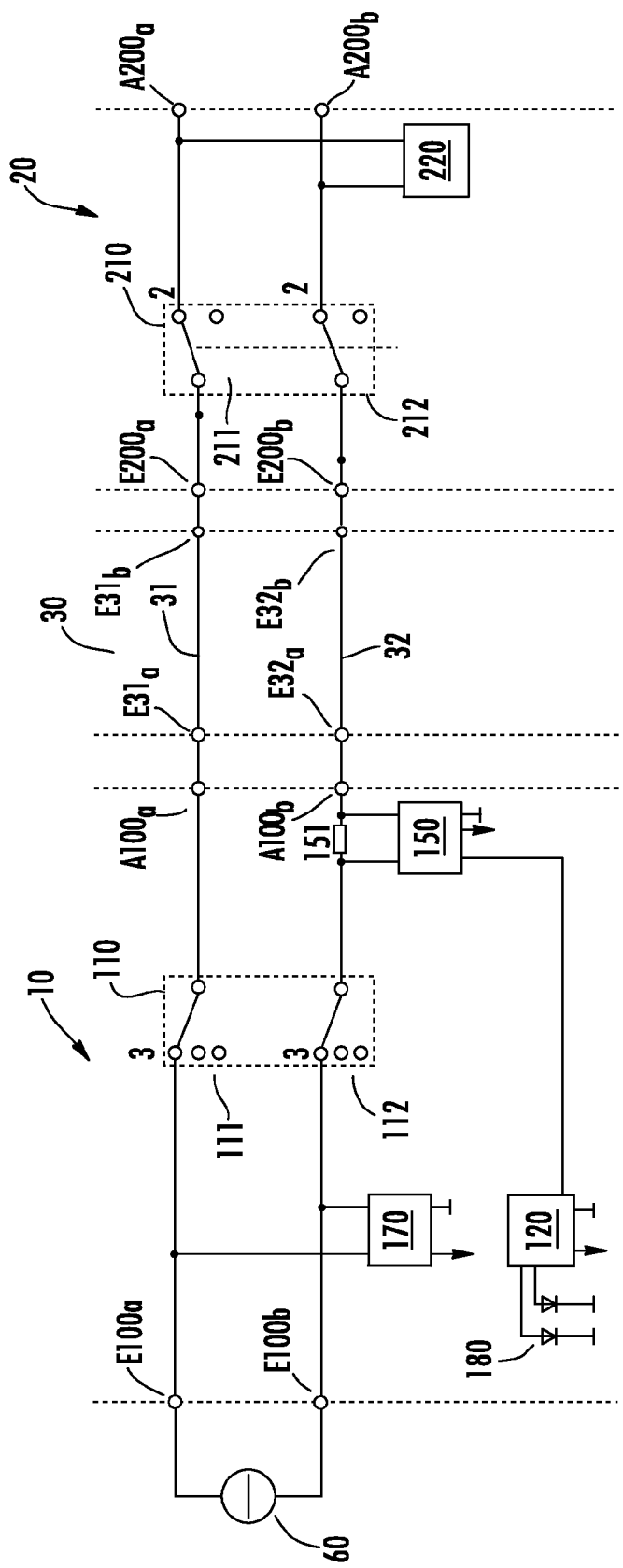
FIG. 9 shows an embodiment of an arrangement of a first and second coupling device coupled to a cable with a dummy load provided in the second coupling device.

FIG. 9 shows an embodiment of an arrangement to supply a supply power via a communication cable 30 wherein the load 70 is disconnected from the output side A200a, A200b of the coupling device 200. In order to detect the connection respectively the disconnection of the remote-side unit 20, even if no remote load 70 is connected to the coupling device 200, a load 250 is provided in the remote side unit 20. The load 250 may be connected between the output terminals A200a, A200b of the coupling device of the remote side unit 20. The load 250 may be formed as a resistor which may be used as a dummy load in the remote side unit 20, or a light source, for example an LED, signaling the operation state at the remote side.

If the controllable switch unit 210 of the remote-side unit 200 is operated in position "2", a certain minimum current flows through the load 250 at the remote side. The load 250 may be configured so that the current through the load is higher than the expected noise on the cable. The load 250 may be switched off, if a remote load 70 is attached to the output side A200a, A200b of the coupling device 200, so that no additional power is consumed by the load.

If the remote side unit 20 has been removed from the end terminals E31b, E32b of the cable 30, the central side unit 10 will enter the initialization state again and will disconnect the supply power source 60 from the cable 30 immediately by switching the controllable switch unit 110 in position "2". Before the controllable switch unit 110 is controlled such that the supply power source 60 is connected again to the cable 30, the central side unit 10 will execute the complete detection procedure as shown in FIG. 4 from the beginning.

Although the present coupling device to couple a supply power source to a communication cable, a coupling device to couple a load to a communication cable, an arrangement to supply a supply power via a communication cable, and a method to supply a supply power via a communication cable have been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the scope of the present coupling devices, the arrangement and the method and are intended to be covered by the appended claims. Variations can be made to the present coupling devices, the arrangement and the method without departing from the scope of the devices, the arrangement and the method. Thus, it is intended that the present coupling devices, the arrangement and the method cover the modifications and variations of the coupling devices, the arrangement and the method provided they come within the scope of the appended claims and their equivalents.

What is claimed:

1. A coupling device to couple a supply power source to a communication cable, comprising:
   an input side to be coupled to the supply power source;
   an output side to be coupled to a first end of the communication cable;
   a controllable switch unit coupled to the output side, and having a first, a second and a third state; and
   a controller to control a switch setting of the controllable switch unit, wherein
   in the first state of the controllable switch unit, the first end of the cable is operated in an idle state, when the first end is coupled to the output side, and a voltage of the cable is detected, and the setting of the controllable switch unit is changed from the first state to the second state, if the detected voltage is below a threshold level,
   in the second state of the controllable switch unit, the output side is coupled to the controller, and, in the condition where the first end of the cable is connected to the output side, the controller is configured to check the reception of an identification signal indicating to the controller that a coupling device to couple a load to the cable is connected to a second end of the cable, and the setting of the controllable switch unit is changed from the second state to the third state, if the identification signal is identified by the controller, and
   wherein, in the third state of the controllable switch unit, the controllable switch unit connects the input side to the output side.

2. The coupling device of claim 1, comprising a transceiver being coupled between the controllable switch unit and the controller, wherein in the second state of the controllable switch unit, the controllable switch unit connects the transceiver to the output side.

3. The coupling device of claim 1, comprising a current sensor to detect a current at the output side, in the condition where the cable is connected to the output side, wherein the controller is configured to change the setting of the controllable switch unit from the third state to the first state, if the detected current exceeds a current threshold level.

4. The coupling device of claim 1, wherein:
   the output side comprises a first output terminal to be coupled to a first line of the cable, and a second output terminal to be coupled to a second line of the cable, and
   a voltage sensor detects a voltage between the first and second output terminal of the cable.

5. The coupling device of claim 4, wherein the controllable switch unit comprises a first controllable switch and a second controllable switch, the first controllable switch being coupled to the first output terminal and the second controllable switch being coupled to the second output terminal.

6. The coupling device of claim 5, wherein:
   the input side comprises a first input terminal and a second input terminal, the first and second input terminals being configured to connect the supply power source between the first and the second input terminals,
   the first controllable switch is configured to switch the first output terminal to the idle state in the first state of the controllable switch unit, and to connect the first output terminal to the transceiver in the second state of the controllable switch unit, and to connect the first output terminal to the first input terminal in the third state of the controllable switch unit, and
   the second controllable switch is configured to switch the second output terminal to the idle state in the first state of the controllable switch unit, and to connect the second output terminal to a reference potential in the second state of the controllable switch unit, and to connect the second output terminal to the second input terminal in the third state of the controllable switch unit.

7. A coupling device to couple a load to a communication cable for receiving power and data, comprising:
   an input side to be coupled to the cable;
   an output side to be coupled to the load;
   a controllable switch unit coupled to the input side, and having a first and a second state; and
   a transceiver to transmit an identification signal identifying the transceiver, wherein in the first state of the controllable switch unit, the controllable switch unit connects the input side to the transceiver, and the transceiver transmits the identification signal to the input side, and
   in the second state of the controllable switch unit, the controllable switch unit connects the input side to the output side.

8. The coupling device of claim 7, comprising:
   a voltage sensor, wherein
   the input side comprises a first input terminal to be coupled to a first line of the cable and a second input terminal to be coupled to a second line of the cable, and
   the voltage sensor is coupled between the first and second input terminal to detect a voltage between the first and second line of the cable, in the condition where the cable is coupled to the input side.

9. The coupling device of claim 8, wherein the controllable switch unit is configured to change the setting of the controllable switch unit from the first state to the second state, if a voltage detected by the voltage sensor increases a first threshold level, and to change the setting of the controllable switch unit from the second state to the first state, if the voltage detected by the voltage sensor decreases a second threshold level, the second threshold level being lower than the first threshold level.

10. A method to supply a supply power via a communication cable, comprising:
   providing a cable having a first end to couple a first coupling device to the cable, the first coupling device being configured to connect a power source to the first end of the cable, and a second end to couple a second coupling device to the cable, the second coupling device being configured to couple a load to the cable;
   operating the first end of the cable in an idle state;

measuring a voltage at the first end of the cable;

generating a request signal by the first coupling device and transferring the request signal from the first end of the cable to the second end of the cable, when the measured voltage is below a threshold value; and generating an identification signal by the second coupling device to identify the second coupling device by the first coupling device and transferring the identification signal via the cable to the first coupling device, when the second coupling device is coupled to the second end of the cable and the request signal is received by the second coupling device.

11. The method of claim 10, comprising coupling the power source to the first end of the cable to supply the supply power via the cable to the second end of the cable, when the identification signal is identified by the first coupling device.

12. The method of claim 11, comprising:

measuring a voltage at the second end of the cable; and coupling the output side of the second coupling device to the second end of the cable, when the voltage measured at the second end of the cable increases a further threshold value.

13. The method of claim 12, comprising:

providing the first coupling device with an input side and coupling the input side to the supply power source, and with an output side and coupling the output side to the first end of the cable, and with a controllable switch unit coupled to the output side of the cable, the controllable switch unit having a first, a second and a third state, and with a controller to control a switch setting of the controllable switch unit;

operating the controllable switch unit of the first coupling device in the first state, in which the first end of the cable is operated in the idle state; and changing the setting of the controllable switch unit of the first coupling device from the first state to a second state in which the first end of the cable is coupled to the controller of the first coupling device, when the measured voltage is below a threshold level.

14. The method of claim 13, comprising:

checking the reception of the identification signal transferred via the cable by the controller of the first coupling device; and changing the setting of the controllable switch unit of the first coupling device from the second state to a third state, in which the controllable switch unit of the first coupling device connects the input side of the first coupling device to the output side of the first coupling device, if the identification signal is identified by the controller.

15. The method of claim 12, comprising:

providing the second device with an input side and coupling the input side to the second side of the cable, and with an output side to be coupled to a load, and with a second controllable switch unit coupled to the input side and having a first and a second state, and with a transceiver to generate the identification signal identifying the transceiver; and operating the controllable switch unit of the second coupling device in the first state, in which the controllable switch unit of the second coupling device connects the input side of the second coupling device to the transceiver of the second coupling device, and the transceiver of the second coupling device transmits the identification signal to the input side of the second coupling device.

16. The method of claim 15, comprising changing the state of the second controllable switch unit from the first state to the second state, in which the controllable switch unit of the second coupling device connects the input side of the second device to the output side of the second device, when a voltage at the input side of the second device exceeds a threshold level.

17. The method of claim 12, comprising:

providing the controllable switch unit of the first coupling device with a first controllable switch and a second controllable switch; and switching a setting of the first and second controllable switch of the first coupling device such that the first end of the cable is operated in the idle state in the first state of the controllable switch unit of the first coupling device.

18. The method of claim 17, comprising switching a setting of the first and second controllable switch of the first coupling device such that the cable is connected to a transceiver in the second state of the controllable switch unit of the first coupling device; and switching a setting of the first and second controllable switch of the first coupling device such that the supply power source is connected to the first end of the cable.

19. The method of claim 18, comprising:

providing the controllable switch unit of the second coupling device with a first controllable switch and a second controllable switch;

switching a setting of the first and second controllable switch of the second coupling device such that the second end of the cable is connected to the transceiver of the second coupling device in the first state of the controllable switch unit of the second coupling device; and switching a setting of the first and second controllable switch of the second coupling device such that the second end of the cable is connected to the output side of the second coupling device.

20. The method of claim 19, comprising connecting the load to the output side of the second coupling device.

* * * * *